(12) United States Patent
Stahl

(10) Patent No.: US 8,829,810 B2
(45) Date of Patent: Sep. 9, 2014

(54) STEP-UP CONVERTER FOR LIGHT-EMITTING DIODES (LEDS)

(76) Inventor: Robert Stahl, Weiden (DE)

( * ) Notice: Subject to any disclaimer, the term of this patent is extended or adjusted under 35 U.S.C. 154(b) by 612 days.

(21) Appl. No.: 13/106,221

(22) Filed: May 12, 2011

(65) Prior Publication Data

US 2011/0279059 A1 Nov. 17, 2011

(30) Foreign Application Priority Data

May 12, 2010 (DE) .......................... 10 2010 016 928

(51) Int. Cl.
*H05B 37/02* (2006.01)
*H05B 33/08* (2006.01)

(52) U.S. Cl.
CPC ........ *H05B 33/0815* (2013.01); *H05B 33/0851* (2013.01); *H05B 37/0227* (2013.01)
USPC ............ 315/294; 315/291; 315/297; 315/312

(58) Field of Classification Search
USPC ........... 315/291, 294, 297, 312; 323/222, 282
See application file for complete search history.

(56) References Cited

U.S. PATENT DOCUMENTS

| 7,301,287 | B1 * | 11/2007 | Lu .............................. 315/185 R |
| 2006/0176029 | A1 * | 8/2006 | McGinty et al. .............. 323/222 |
| 2008/0258637 | A1 * | 10/2008 | Leung ......................... 315/185 R |
| 2009/0315484 | A1 * | 12/2009 | Cegnar et al. ................. 315/307 |
| 2010/0014322 | A1 * | 1/2010 | Harrison .......................... 363/17 |

FOREIGN PATENT DOCUMENTS

| EP | 153690 | * | 6/2005 |
| EP | 1536390 A1 | | 6/2005 |
| WO | 2009134885 A1 | | 11/2009 |

OTHER PUBLICATIONS

May 3, 2013, Search Report from European Patent Office in EP Application No. 11165866.2, which shares the same priority as this U.S. application.
"MAX 761/MAX 762-12V/15V or adjustable, high-efficiency, Low IQ, Step-up DC-DC Converters" manual, Jan. 1, 1993 (obtained Apr. 24, 2013 at http://datasheets.maximintegrated.com/en/ds/MAX761-MAX762.pdf), Maxim Integrated Products, Sunnyvale, California.
"HL-800 ATEX Users Guide" manual, Oct. 1, 2009 (obtained Apr. 24, 2013 at http://www.mica.fi/en/data/Hl-800ATEX-ENGL-2009.pdf), Mica Elektro OY Ltd., Helsinki, Finland.
Nov. 30, 2012, Search Report from European Patent Office in EP Application No. 11165866.2, which shares the same priority as this U.S. application.

* cited by examiner

*Primary Examiner* — Tung X Le
*Assistant Examiner* — Jonathan Cooper
(74) *Attorney, Agent, or Firm* — Kolisch Hartwell, P.C.

(57) ABSTRACT

The present invention relates to a circuit for controlling at least one LED and to a light- and/or signal element including said circuit, wherein the circuit facilitates an optimum utilization of any input voltage provided by an energy source and provides constant light intensity of the LEDs independent from an input voltage. For this purpose, the circuit contains a step-up converter arranged in the circuit in a way such that the step-up converter outputs a voltage adapted to a forward voltage of the at least one LED at a constant current independent from an input voltage provided by the energy source.

20 Claims, 10 Drawing Sheets

STEP-UP CONVERTER FOR LIGHT-EMITTING DIODES (LEDS)

CROSS-REFERENCE TO RELATED APPLICATION

This application claims priority from German Patent Application No. 10 2010 016 928.5, filed May 12, 2010, which is hereby incorporated by reference.

BACKGROUND

The present invention relates to a circuit for controlling light-emitting diodes (LEDs).

In order to improve traffic safety during darkness, active and passive light elements are often used for identifying humans and also animals. Besides passive light elements like for example reflectors, active light elements are also used, which are often configured as battery- or accumulator operated LED units. In conventional battery operated light- and signal elements, however, there is an issue that, on the one hand, sufficient, constant and reliable illumination needs to be provided, and on the other hand, the weight of the light element needs to be limited.

An embodiment of a conventional light- and signal element and a circuit for controlling the LEDs is described in EP 1 536 390 A1. The light- and signal element, which is in particular usable as a collar for animals, includes a motion detector so that the LED module is turned on when a movement is detected in the periphery or when the LED module moves itself. This prevents the LED module from being illuminated when it is not in use in order to save energy and increase reliability.

However, there is an additional problem in that the energy provided in the batteries or accumulators is only partially used. The reason is that a forward voltage of the LEDs varies in a range of 1.6 V-3 V, depending on the color, so that the batteries or accumulators can only be discharged to a threshold voltage which corresponds to the amount of the forward voltage of the LEDs. Thus, an energy source is required which puts out a suitable voltage over a longer time period.

However, using powerful energy sources also increases the weight of the light- and signal element.

Furthermore, conventional battery operations of light- and signal elements have the disadvantage that the light intensity of light- and signal elements with identical configurations is highly variable, since also the forward voltage of LEDs with identical color is highly variable from batch to batch. This fact has proven to be a problem since no reliable illumination can be provided with a minimum light intensity of the light- and signal element.

Another problem of the prior art is that the light intensity of the light- and signal element continuously decreases for conventional battery operations with increasing operating time. Additionally, prior art circuits also use current in standby mode or hibernation, so that the batteries are depleted after a few weeks or months while the light element is not being operated.

SUMMARY

The present invention relates to a circuit for controlling light-emitting diodes (LEDs), wherein the circuit facilitates an optimum utilization of any input voltage provided by an energy source, in particular an energy accumulator, and provides constant light intensity of the LEDs independent from an input voltage. The invention furthermore relates to a light- and/or signal element including the circuit according to the invention and it also relates to a method of using the light- and/or signal element. One or more embodiments of the present invention may include one or more of the features described below.

Besides conventional circuits for light- and signal elements, it is an object of the present invention to provide a circuit for controlling LEDs which solves the problem of prior art light elements. In particular, the object of the circuit is to use the provided, in particular stored, energy in an optimum manner to assure constant light intensity of the controlled LEDs over a long time period and to control the light intensity of the controlled LEDs compared to the LEDs of a light element of the same type so that the light intensity of light elements of the same type is identical. It is another object of the invention to substantially prevent leakage currents in a standby mode or hibernation.

This object is achieved for example by the circuit for controlling at least one LED according to claim 1 and by the light- and/or signal element according to claim 14. Other embodiments of the circuit of the light- and/or signal element are provided by the respective dependent claims.

According to the invention, the circuit for controlling at least one LED, which includes a characteristic forward voltage, includes first contacts for connecting an energy source, second contacts for connecting the at least one LED, and a step up converter. Thus, the step up converter is connected with the first and second contacts, so that the step up converter delivers a variable output voltage that is adapted to the forward voltage of the at least one LED independently from an input voltage provided by the energy source, wherein the step up converter simultaneously puts out a constant current. The constant current is preferably 5 mA to 50 mA, in particular 12 mA.

The circuit connection according to the invention of the step up converter facilitates that the light intensity of the LEDs remains absolutely constant over a range of variable input voltages, in particular 3.2 V-0.6 V, in particular 3.2 V to 1V, since the step up converter delivers constant current, independently from the input voltage. Due to the increase in the input voltage through the step up converter, the available energy of the energy source or of the energy storage device can be used in an optimum manner. Furthermore, the use of the step up converter according to the invention facilitates that the output voltage of the step up converter is adapted to the forward voltage of the at least one LED and that the LEDs of light- and/or signal elements with identical configurations are illuminated with the same light intensity.

The first contacts are preferably configured as contacts for connecting an energy storage device configured as at least one battery or accumulator. In particular, the first contacts are configured and arranged so that two or more batteries or accumulators can be received and connected. Also, energy stores can be used which provide a maximum voltage which is lower than the characteristic forward voltage of the at least one LED.

The second contacts can be configured so that they connect one or plural, in particular four, LEDs, in particular one or plural, in particular four, colored LEDs in a parallel connection with the circuit according to the invention. When plural LEDs shall be connectable with the circuit, the second contacts shall be configured so that a flat cable holding the LEDs is contactable. Alternatively, the circuit can include plural second contacts in order to contact the LEDs one by one, wherein the second contacts are thus preferably arranged so that they form a parallel connection of some or all LEDs with one another.

The circuit according to the invention can include a resistor which is connected with the step up converter so that the output voltage adapted to the forward voltage of the at least one LED is controllable through the voltage dropping at the resistor. The regulation of the step up converter as a function of the voltage drop at the resistor facilitates adjusting a suitable output voltage that is adapted to the forward voltage of the LED and delivering a constant current.

In particular, the resistor can be installed into the circuit, so that it is connected between a control input of the step up converter and a ground. The connection of the resistor with the ground can be provided, for example, through a transistor in order to be able to deactivate a voltage divider in standby mode or hibernation. Preferably, the resistor is connected in series with the second contacts. When plural second contacts are provided, the resistor is preferably connected in series with a parallel connection of the second contacts. However, alternative arrangements of the resistor, possibly in combination with a measuring unit for measuring the voltage drop, are feasible.

The circuit can furthermore include at least one component with a particular forward voltage, in particular a semiconductor component with a particular threshold voltage of a semiconductor junction, in particular at least one diode (e.g., a Schottky diode or a double Schottky diode), which is connected between the resistor and the step up converter, in particular connected between the resistor and the regulation input of the step up converter. Preferably, the circuit includes two or more suitable components, like for example two or more diodes. The at least one component with defined forward voltage, in particular the at least one diode, is provided so that the voltage drop measured at the resistor is artificially increased so that a high power loss at the resistor is prevented. This also provides an extension of the runtime of the energy storage device.

Furthermore, the circuit and/or the step up converter can include a detection device for detecting an undercut of the threshold of the input voltage. The detection of a threshold undercut of the input voltage, this means in particular of the battery- or accumulator voltage, facilitates putting out a warning indication in order to prevent the light element from suddenly breaking off due to an input voltage of less than 1 V, in particular less than 0.6 V. When using for example two alkaline batteries, an input voltage can be selected in a range of 1.3 V to 1.8 V, in particular 1.6 V, or when using two accumulators, an input voltage can be selected in a range from 2.4 V to 2.6 V.

In order to indicate changing an energy source to a user of a light element early on, the circuit can furthermore include a circuit unit for indicating undercutting the threshold for the input voltage. The circuit unit for indicating the undercut of the voltage threshold value can be connected for example with the second contacts, so that the at least one LED flashes, its light intensity decreases and/or pulsates. Alternatively or additionally, the circuit unit can be configured so that an additional LED is activated and/or an acoustic and/or a tactile warning signal is put out. It can be indicated to a user through the respective signals that the LEDs only continue to be lit for a short period of a time, in particular less than one hour, in particular less than 30 minutes. Thus, the remaining illumination time is determined by the selected threshold value. The light intensity of the LEDs can significantly decrease during the remaining illumination time.

Preferably, the circuit unit for identifying undercutting the threshold value of the input voltage can be implemented as a feedback of an input and of an output of a detection device through a capacitor. In particular, when using a step up converter with integrated low voltage detection, the circuit unit can be configured as a feedback of the respective inputs and outputs of the step up converter through a capacitor. The circuit then causes a flashing of the least one LED.

Conventional circuits of light elements also consume power in standby mode or hibernation, so that an energy storage device, even when the light element is not being used, is not depleted after a few weeks due to leakage currents. The circuit according to the invention is therefore preferably configured so that leakage currents are essentially prevented in a standby or hibernation condition of the circuit and only a quiescent (remote) current of the step up converter flows. This can be for example implemented in that the circuit includes a voltage divider and a transistor which are connected in a suitable manner between the first contact and the step up converter, so that only a quiescent current of the step up converter flows. Thus, the quiescent current of the step up converter is 1 µA at the most, in particular 0.5 µA or less, so that the energy storage device is strained very little even after months, and no substantial discharge takes place.

Dependent on the way of using a light element which includes a circuit according to the invention, the circuit can additionally include an automatic or manual switch on- and switch off mechanism. An automatic or manual switch on- and switch off mechanism can include at least one sensor, through which a switch is being closed to activate the step up converter. Thus, the at least one sensor can be selected from the group including a motion sensor, temperature sensor, inclination sensor, or infrared sensor. When the sensor delivers a signal, then the switch is, for example, being closed. Otherwise, when the sensor delivers no signal, then the circuit automatically switches off. Preferably the switch on- and switch off mechanism includes a combination of plural different sensors. The light element can be activated for example through a movement sensor, and an additional light sensor is provided so that activation only occurs during darkness.

The switch on- and switch off mechanism can include a switch off delay in order to provide that the circuit remains activated for a particular time period, also when the sensor does not put out any signal. The switch off delay is configured, so that the circuit remains activated for at least 5 minutes, in particular for at least one minute.

The circuit is preferably arranged on a carrier. Mainly for example circuit boards and also flexible conductor paths are suitable as carriers. This on the one hand facilitates simple production, since components of the circuit can be machine soldered on circuit boards or flexible conductor paths, and thus only particular main connections have to be soldered between the circuits boards. On the other hand, flexible circuit boards provide the option to form a light element which adapts to particular shapes, so that for example bands can be formed.

The present invention furthermore relates to a light and/or signal element with at least one LED, an energy source, and a circuit according to the invention. Thus, the LED is preferably a colored LED. For an energy source, an energy storage device, in particular configured as a battery or a rechargeable battery, can be provided, wherein, in particular, energy storage devices are usable which provide a maximum voltage, which is lower than the characteristic forward voltage of the at least one LED. Preferably, the energy source is formed from two standardized batteries or respective accumulators. The circuit is configured, so that it includes a step up converter which increases the input voltage provided by the energy source to an output voltage adapted to the forward voltage of the at least one LED, and thus delivers a constant current. The circuit can include all of the features recited supra in combination or separate from one another.

The light- and signal element preferably includes a plurality of LEDs, in particular four LEDs. They are preferably partially connected in parallel or they are all connected in parallel. Preferably, all LEDs have the same forward voltage.

The light- and/or signal element preferably includes a shell in whose interior the LEDs, the energy source, and the circuit are arranged. Thus, the shell is preferably partially or completely transparent, so that sufficient illumination is facilitated. Furthermore, the shell can be configured so that it envelopes the LEDs, the circuit, and/or the energy source in a humidity tight, in particular hermetic, seal so that functionality is provided irrespective of ambient conditions. The shell is preferably formed from an elastic material, so that flexible elements can be formed, which reduce the risk of injury and increase the stability of the light- and/or signal element.

The LEDs, the circuit, and the energy source are preferably arranged in an annular manner. Besides the LEDs, the circuit and the energy source can be elastically connected with one another. This can be further provided through a flexible conductor circuit board on which the LEDs and the circuit are soldered. The LEDs, the circuit, the energy source, and the carrier material can be thus received in the shell, so that flexible bands, in particular arm bracelets, foot bracelets or neck collars, can be formed. Thus, a suitable attachment of the light element to a living being, in particular to a human or an animal, or to a moving object, is facilitated. Flexible bands can be carried comfortably around a neck, arm, or leg, or can be attached to a moving object in a simple manner.

The described light- and/or signal element can be used for example for identifying a moving object or a living being in the dark, in particular for identifying a human or an animal, in particular a dog. Thus, it is conceivable that a human attaches the light- and/or signal element at his upper arm or that the light- and/or signal element is configured as a collar for a dog.

BRIEF DESCRIPTION OF THE DRAWINGS

Embodiments of a circuit according to the invention for a light- and/or signal element are provided, wherein.

DETAILED DESCRIPTION

Figure 1:
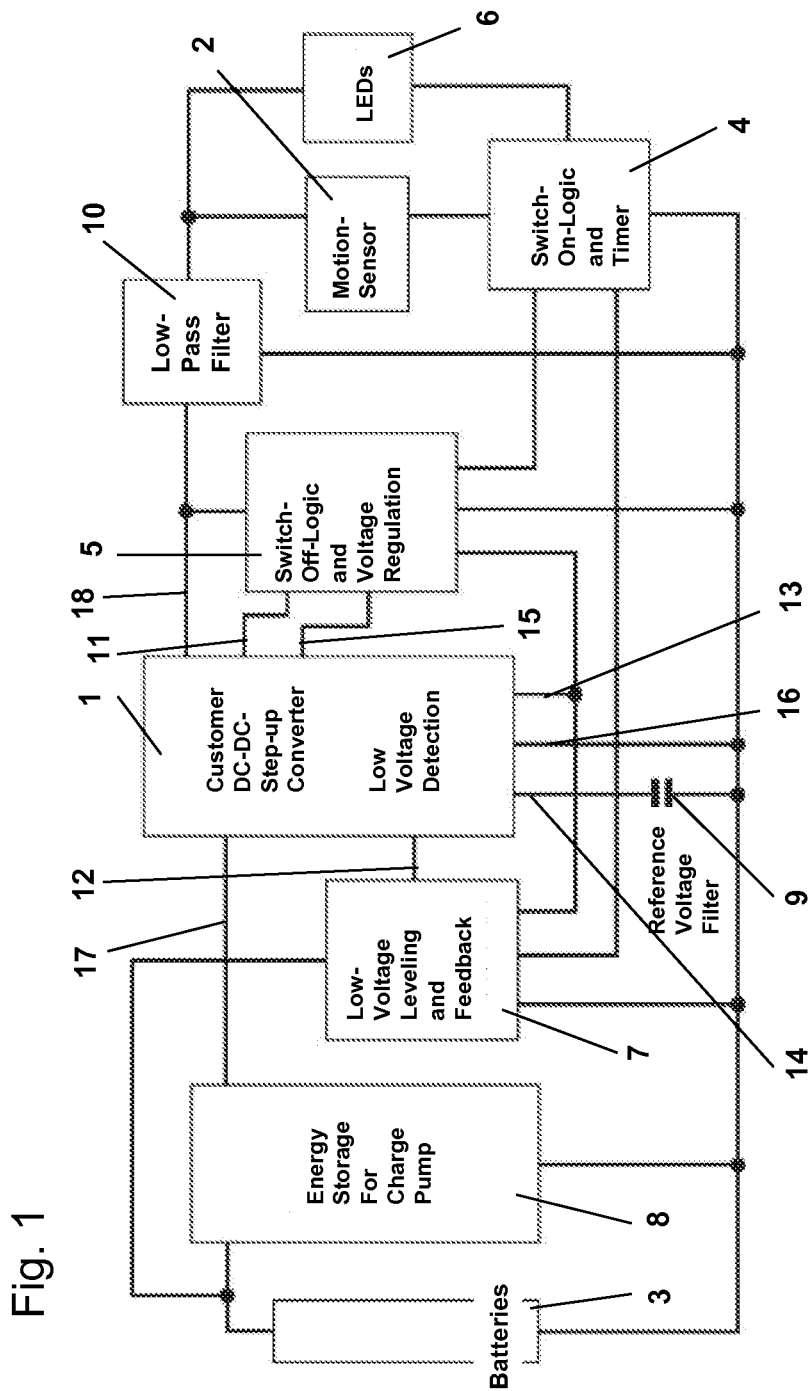
FIG. 1 illustrates a schematic diagram of a light- and/or signal element according to an embodiment of the invention including the circuit for controlling the LEDs.

FIG. 1 illustrates a step up converter 1 in the center, which is configured so that it converts a variable input voltage into an increased output voltage adapted to a forward voltage of the LEDs 6, wherein the current that is simultaneously put out is constant. The step up converter 1 includes the following eight contacts: a control input 11; two low voltage detection contacts 12 and 13; a reference voltage input 14; an activation contact 15; a ground contact 16; an input voltage input 17; and a voltage output 18. The connections 17 and 18 are connected with one another through a diode (not illustrated), so that a voltage of the batteries 3 can reach through the step up converter 1 to the motion sensor 2 or to a switch (not illustrated) that is automatically operated by the motion sensor. As soon as the switch is closed due to a respective sensor signal, current flows to a switch-on-logic 4. The switch-on-logic 4 can include a transistor that opens as soon as the switch is closed. Opening the transistor facilitates a current flow through the switch-off-logic and voltage regulation 5 to the input 15 of the step up converter 1, so that the step up converter 1 is activated. When the power supply to the transistor is interrupted by closing the switch, no current flows anymore and the step up converter 1 and a voltage divider are deactivated. Then the circuit is in a passive mode.

When the step up converter 1 is activated, it generates a higher voltage at the output 18 than the input voltage delivered by the batteries 3 at the connection 17. The regulation of the output voltage at the connection 18 is provided through the switch-off-logic and voltage regulation 5, wherein a voltage drop is measured at a resistor (not illustrated) which is connected with a ground, for example, through the transistor of the switch-on-logic 4, wherein the voltage drop is provided to the regulation input 11. This facilitates that the step up converter puts out a constant current and the voltage automatically adapts itself to the forward voltage of the LEDs. This facilitates that the LEDs 6 are always illuminated with the same light intensity irrespective of the input voltage at the input 17.

The schematic diagram of FIG. 1 furthermore illustrates a low voltage leveling and feedback 7 which is connected between the connections 12 and 13 of the step up converter 1. The low voltage regulation and feedback 7 have the effect that the LEDs 6 start to blink in a timely manner before the end of the battery service life as soon as the voltage of the battery 3 has undercut a threshold value. The threshold value is typically, approximately 1.6 V. The flashing function is implemented through a capacitor (not illustrated), which is included in the feedback circuit between the connections 13 and 12.

In the schematic diagram of FIG. 1 additionally installed are an energy storage for charge pump 8, a reference voltage filter 9 and a low pass filter 10, which are provided for sifting or stabilizing the voltage generated by the step up converter.

Figure 2:
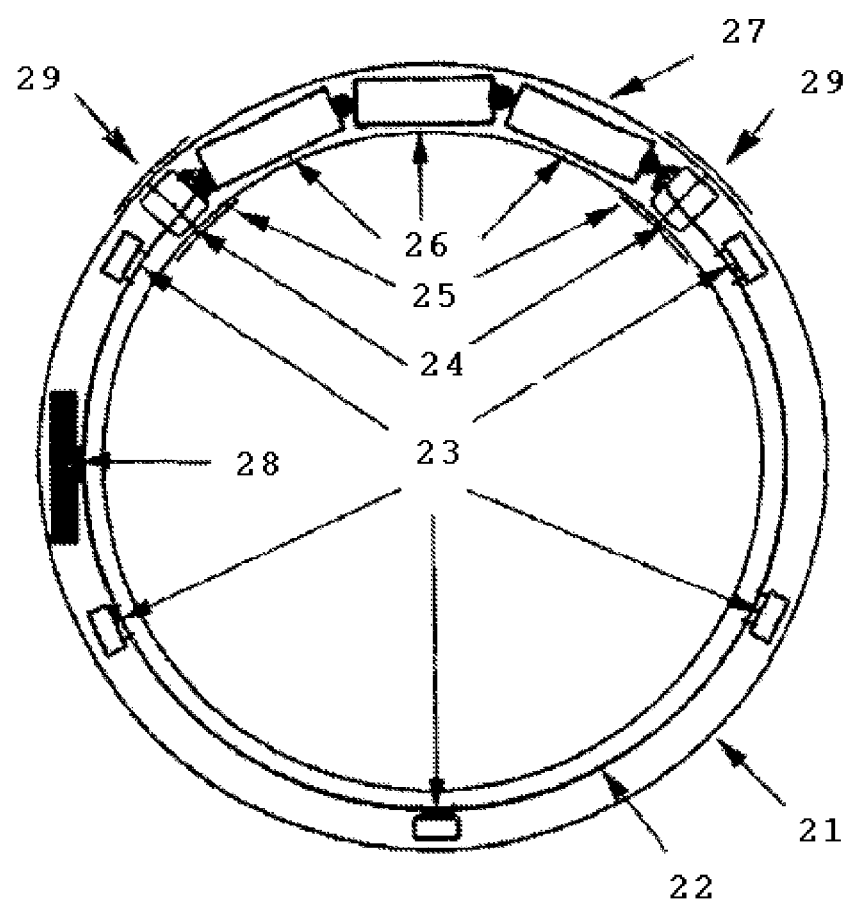
FIG. 2 illustrates a light- and/or signal element according to an embodiment of the invention.

FIG. 2 presents a light- and/or signal element configured like a dog collar. FIG. 2 shows a cross-sectional view through the dog collar, which is formed from a first sub-ring 21 and a second sub-ring 27 which can be connected to the first sub-ring 21 by connectors 29.

The two sub-rings 21 and 27 are each made from tubing into the ends of which the connectors 24 for mutually connecting the sub-rings 21 and 27 can be inserted. In this regard, sub-ring 21 is formed especially as a transparent fabric tubing.

In addition, the sub-rings 21 and 27 are connected by two rubber or silicone rubber tubes 25 or are sealed at the connecting points 29. The two rubber or silicone tubes 25 have a smaller diameter than the sub-rings 21 and 27 of preferably of fabric tubing, such that sealing contact is made between the rubber or silicone tubes 25 and the sub-rings 21 and 27 at the connecting points 29 on account of the elastic extension of the rubber or silicone tubes 25.

The sub-ring 27, which may also be called the battery tube or battery sub-ring, accommodates an arrangement of several batteries 26 or rechargeable batteries (accumulators) that provide the power supply. In the embodiment shown in FIG. 2, three batteries 26 in the sub-ring 27 are arranged one behind the other.

Sub-ring 21, which may also be called the LED sub-ring, accommodates the electronic arrangement of the illuminated dog collar of FIG. 2 with several LEDs 23, which are connected to each other and to the module 28 and the connectors 24 via flat cables or strip cables 22. At the connectors 24, the strip cable 22 is connected to battery contacts, which, in turn, make contact with the batteries 26 of the battery sub-ring 27 when sub-rings 21 and 27 are pushed together to form the dog collar. Preferably, the battery contacts can be chosen from corresponding spring elements, whose elastic deformation affords adequate contact when the sub-rings are pushed together.

The module 28, which is only shown schematically in FIG. 2, comprises the components of the circuit being shown in FIG. 1.

Figure 3:
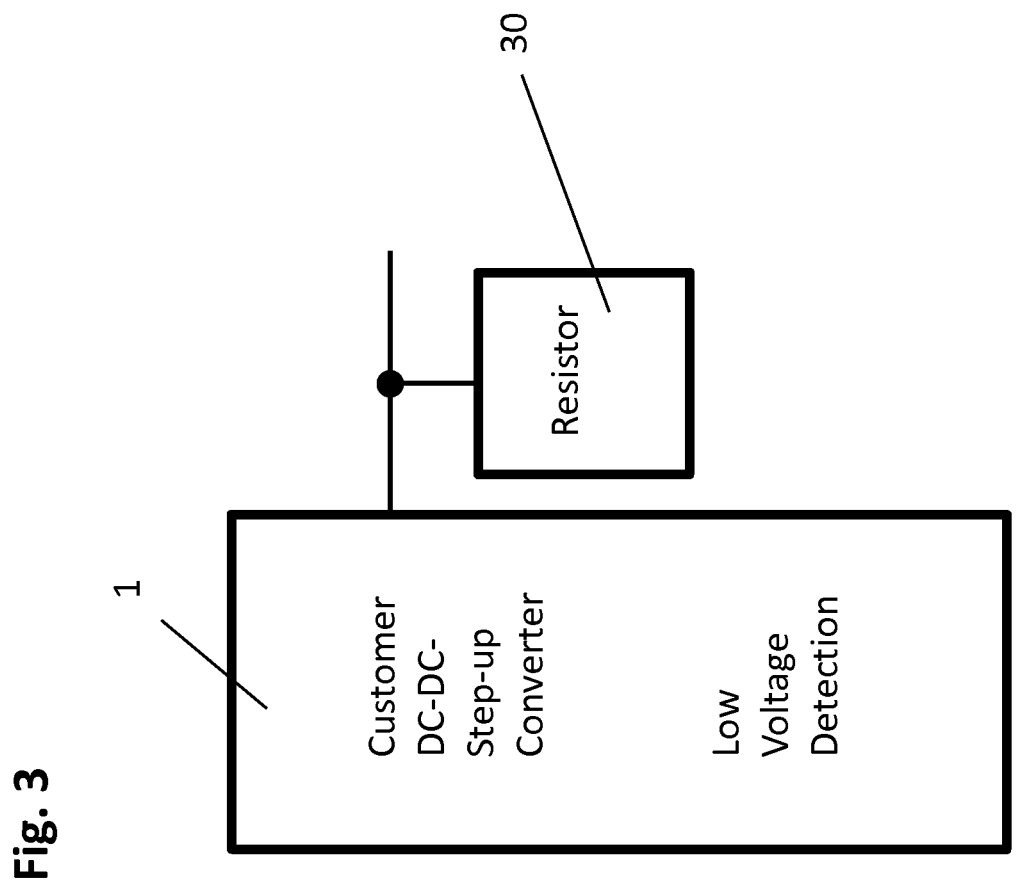
FIG. 3. illustrates a partial schematic diagram of a circuit for controlling the LEDs showing a resistor that is connected with the step up converter.

FIG. 3 illustrates wherein the circuit includes a resistor 30, which is connected with the step up converter, so that the output voltage adapted to the characteristic forward voltage of the at least one LED is controllable through a voltage dropped at the resistor.

Figure 4:
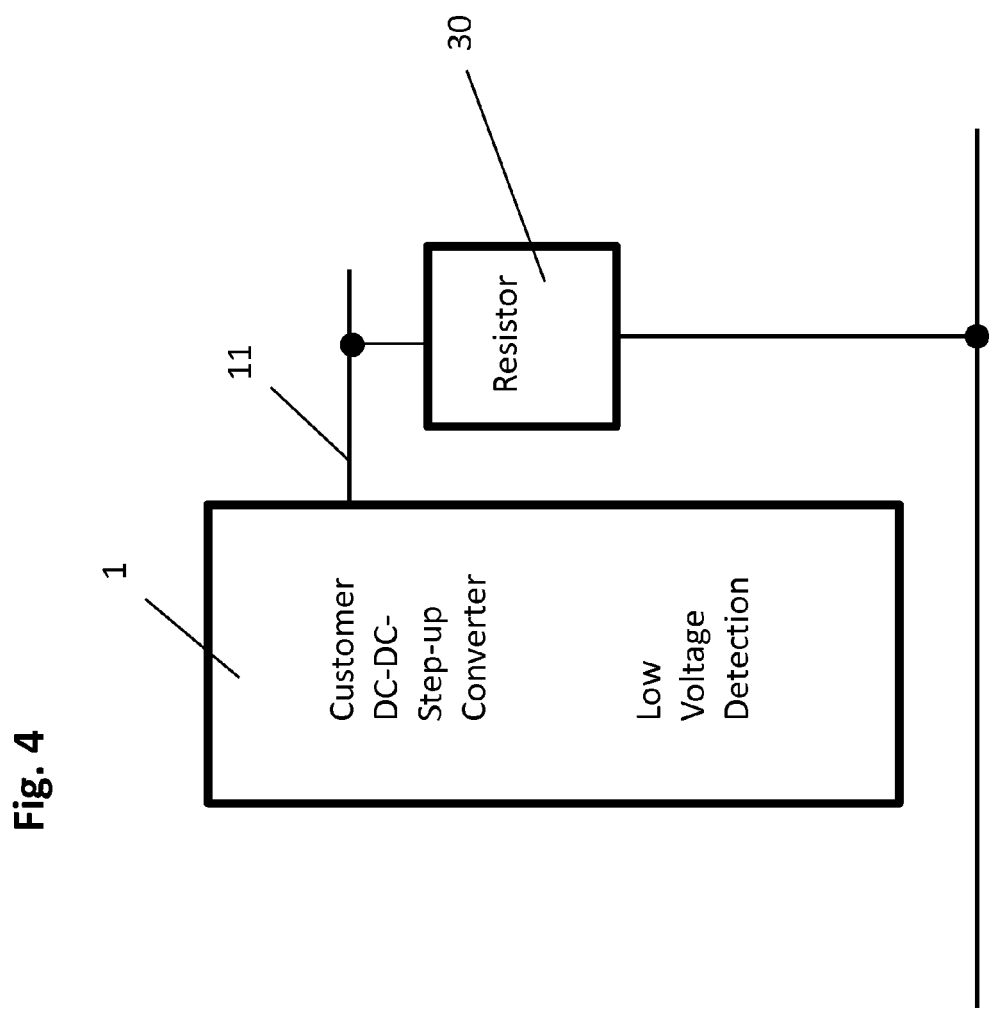
FIG. 4 illustrates a partial schematic diagram of a circuit for controlling the LEDs showing a resistor connected between a regulation input of the step up converter and a ground.

FIG. 4 illustrates wherein the step up converter includes regulation input 11 and the resistor is connected between the regulation input and a ground, in particular in series with the second contacts.

Figure 5:
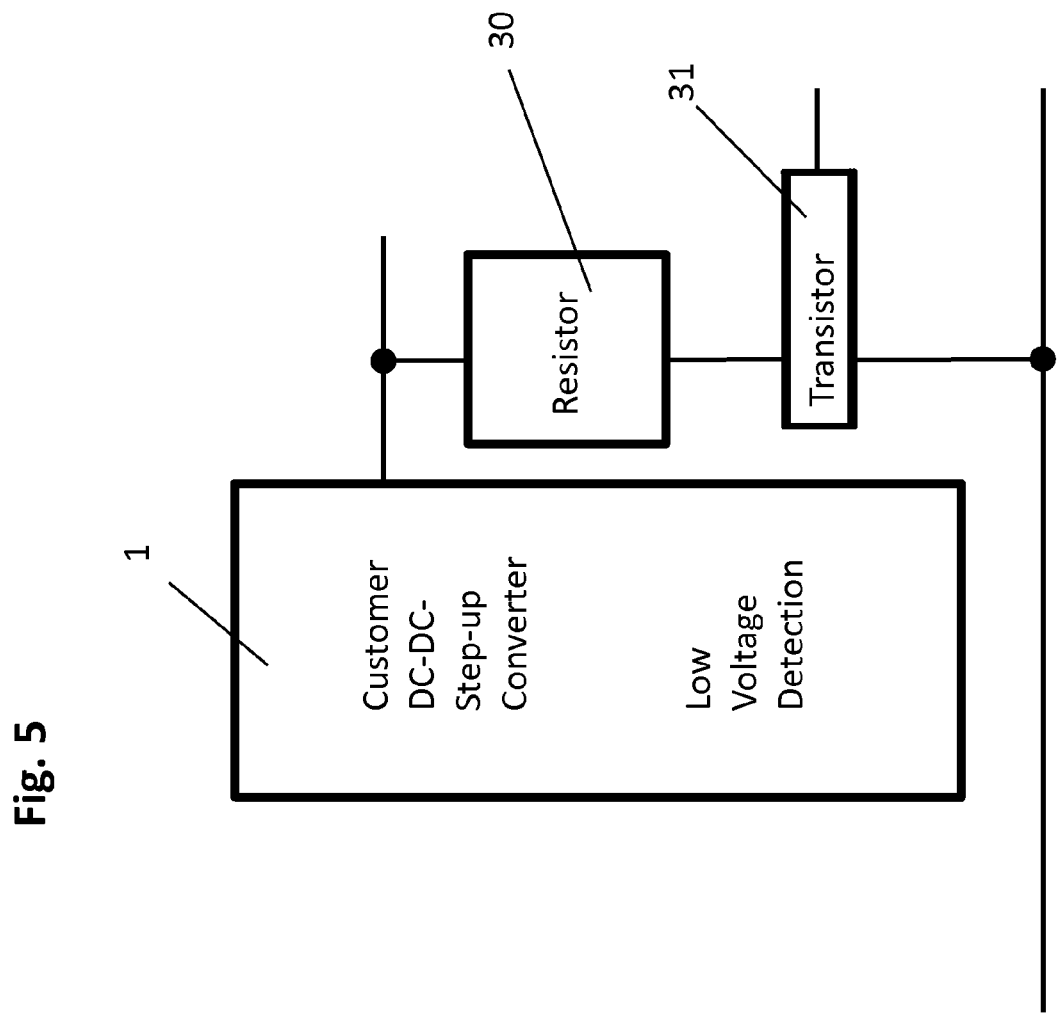
FIG. 5 illustrates a partial schematic diagram of a circuit for controlling the LEDs showing a resistor connected through a transistor to a ground.

FIG. 5 illustrates wherein the resistor is connected through a transistor 31 to a ground.

Figure 6:
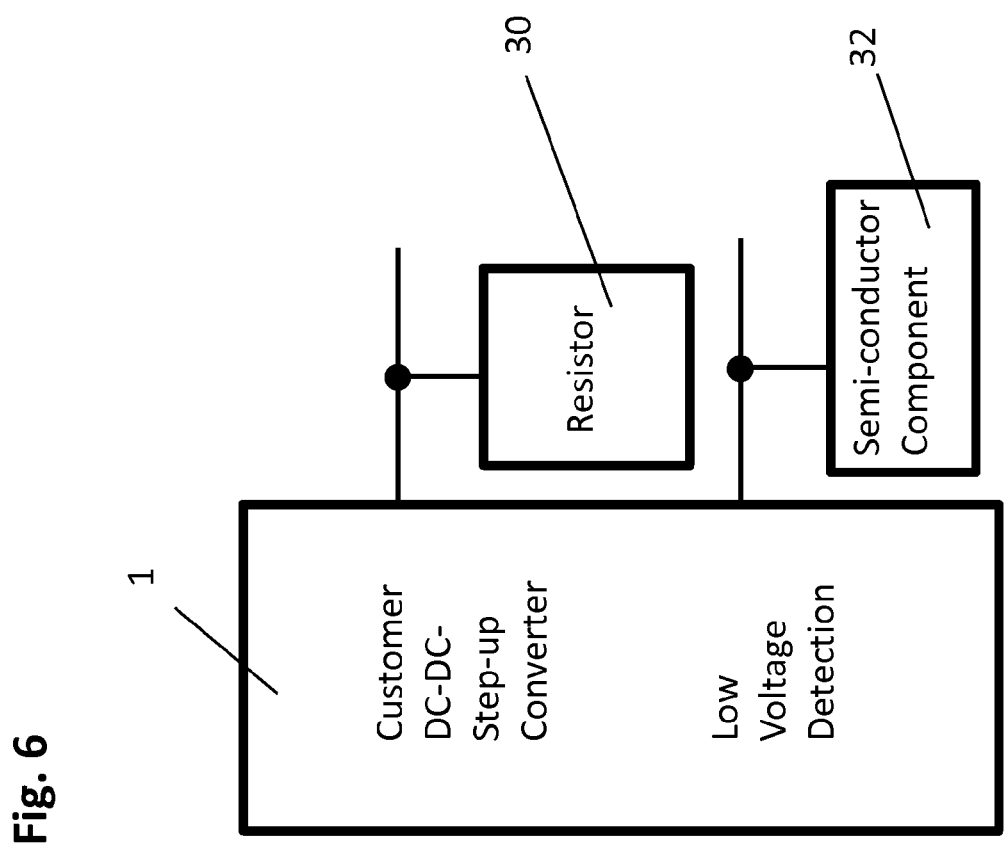
FIG. 6 illustrates a partial schematic diagram of a circuit for controlling the LEDs showing a semi-conductor component with a defined threshold voltage of a semi-conductor junction.

FIG. 6 illustrates wherein the circuit includes a component with a defined forward voltage, in particular a semi-conductor component 32 with a defined threshold voltage of a semi-conductor junction.

Figure 7:
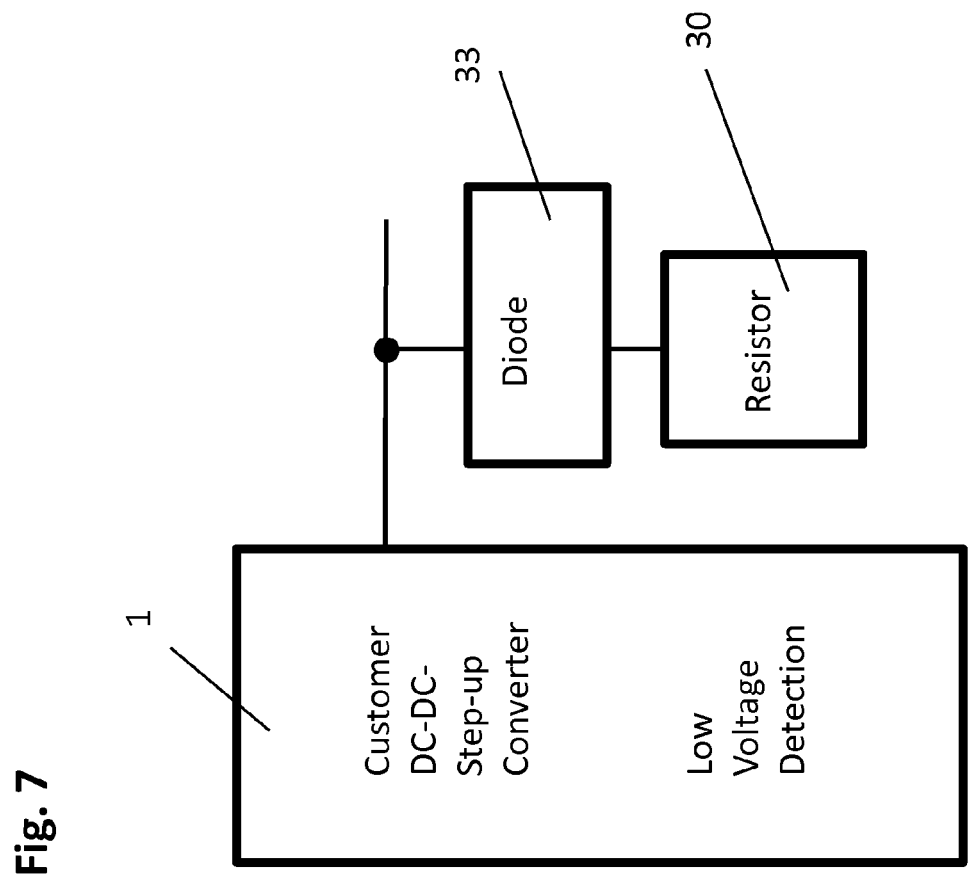
FIG. 7 illustrates a partial schematic diagram of a circuit for controlling the LEDs showing a diode that is connected between the resistor and the step up converter.

FIG. 7 illustrates wherein the component is a diode 33 that is connected between the resistor and the step up converter.

Figure 8:
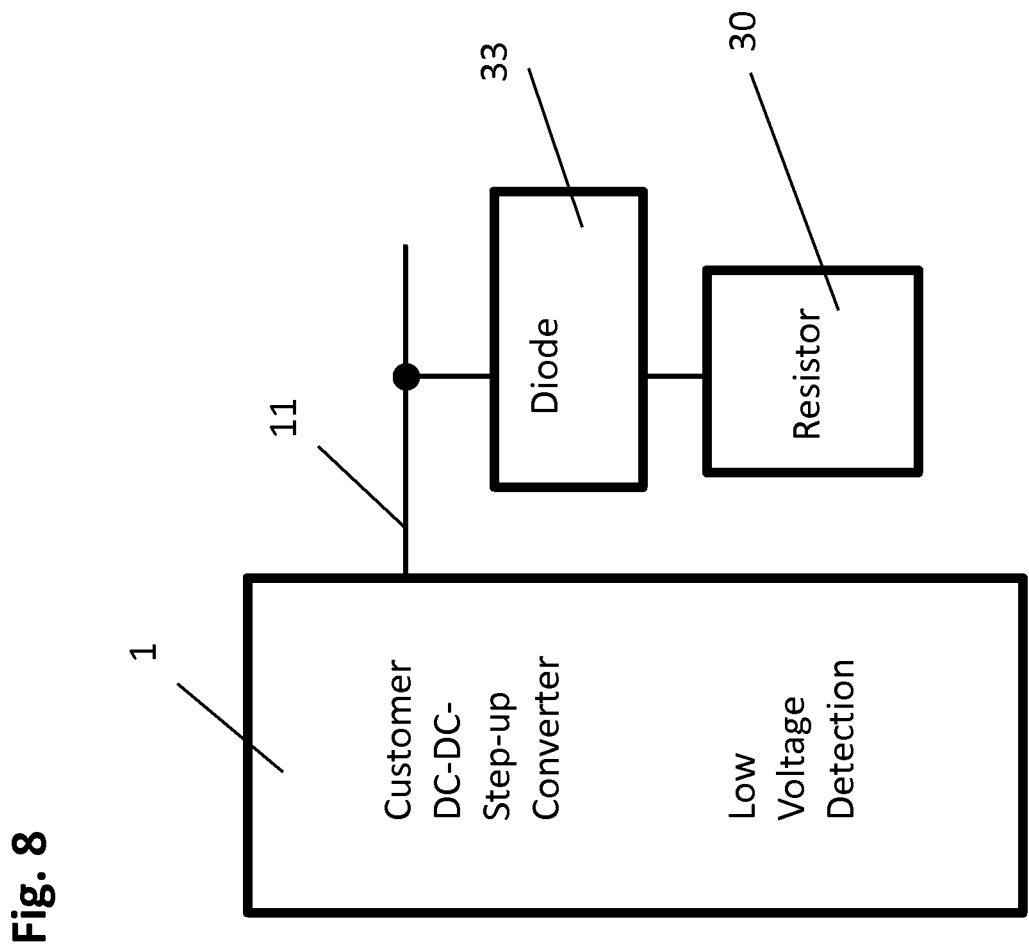
FIG. 8 illustrates a partial schematic diagram of a circuit for controlling the LEDs showing a diode that is connected between the resistor and the regulation input of the step up converter.

FIG. 8 illustrates wherein the diode is connected between the resistor and regulation input 11 of the step up converter.

Figure 9:
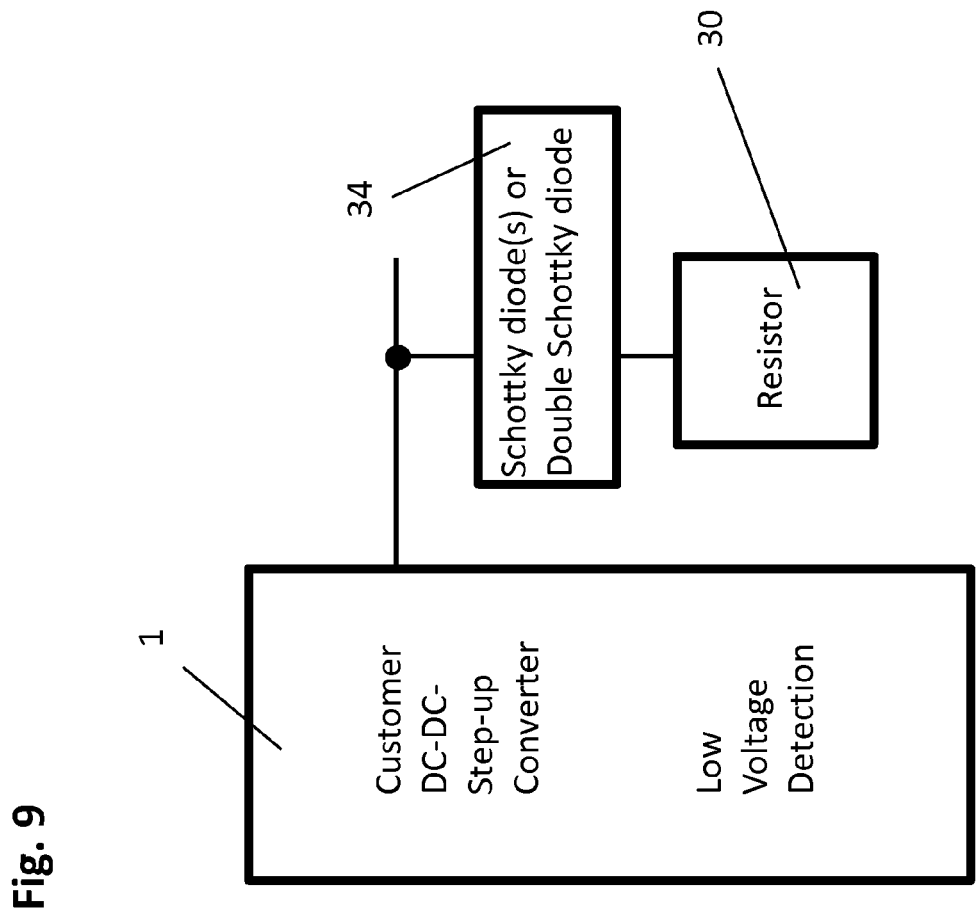
FIG. 9 illustrates a partial schematic diagram of a circuit for controlling the LEDs showing one or plural Schottky diodes, or a double Schottky diode connected between the resistor and the step up converter.

FIG. 9 illustrates wherein the diode includes one or plural Schottky diodes or a double Schottky diode 34.

Figure 10:
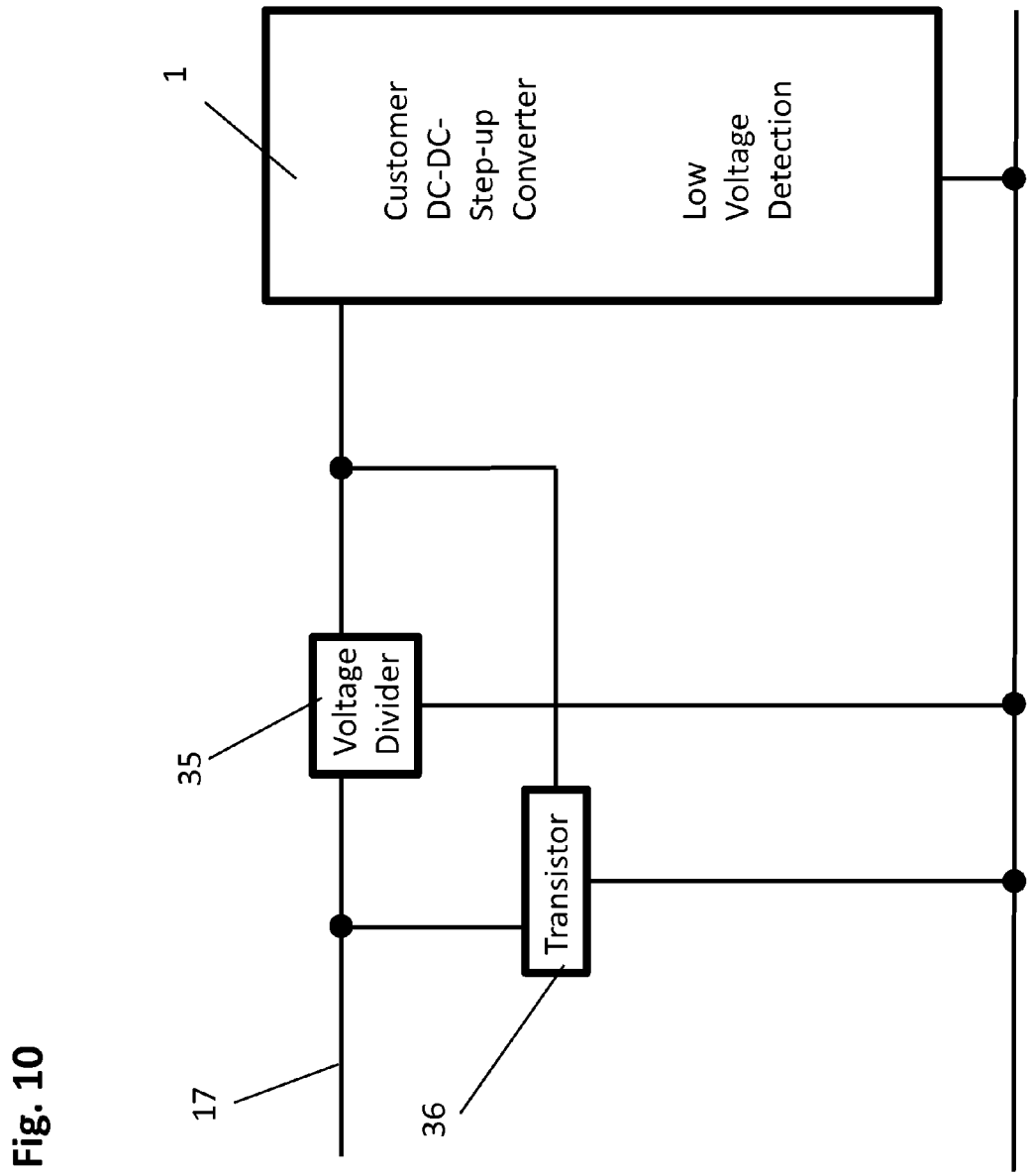
FIG. 10 illustrates a partial schematic diagram of a circuit for controlling the LEDs showing a voltage divider and a transistor that are each connected between the first contacts and the step up converter.

FIG. 10 illustrates wherein the circuit is configured so that it includes a voltage divider 35 and a transistor 36 that are each connected between the first contacts and the step up converter, so that only a quiescent current of the step up converter flows in standby mode or hibernation.

The circuit according to the invention for controlling LEDs and the light- and/or signal elements thus in conclusion facilitate an optimum utilization of the energy of a battery or accumulator up to a minimum voltage of approximately 0.6 V, while conventional circuits only facilitate utilizing the battery voltage up to the level of the LED forward voltage (typically 2.5 V). Thus, the circuit furthermore provides uniform light intensity for the LEDs of light- and/or signal elements with identical configurations. Other energy sources are also suitable which put out a relatively low voltage to assure a constant light intensity of the LEDs. Eventually the circuit according to the invention and the light- and/or signal element facilitate preventing a leakage current during standby mode or hibernation. Thus, the present invention provides numerous advantages over the prior art.

I claim:

1. A circuit for controlling at least one LED with a characteristic forward voltage, wherein the LED is operable through at least one energy source, the circuit comprising first contacts for connecting the energy source, second contacts for connecting the at least one LED, and a step up converter, wherein the step up converter is connected with the first contacts and with the second contacts so that the step up converter provides a variable output voltage adapted to the characteristic forward voltage of the at least one LED at a substantially constant current independent from an input voltage provided by the energy source, wherein the circuit includes a device for detecting an undercut of a threshold value of the input voltage, and wherein the circuit includes a circuit unit for identifying an undercut of a threshold value of the input voltage, wherein the circuit unit is implemented as a feedback of an input and an output of the device for detecting an undercut of the threshold value of the input voltage through a capacitor, and wherein the circuit unit for identifying an undercut of the threshold value of the input voltage is connected with the second contacts so that it generates a blinking of the LED when the threshold value is undercut, wherein the blinking of the LED is implemented through the capacitor included in the circuit unit for identifying an undercut of a threshold value of the input voltage.

2. The circuit of claim 1, wherein the circuit includes a resistor, which is connected with the step up converter, so that the output voltage adapted to the characteristic forward voltage of the at least one LED is controllable through a voltage dropped at the resistor.

3. The circuit of claim 2, wherein the step up converter includes a regulation input and the resistor is connected between the regulation input and a ground, in particular in series with the second contacts.

4. The circuit of claim 2, wherein the resistor is connected through a transistor to a ground.

5. The circuit of claim 2, wherein the circuit includes a component with a defined forward voltage, in particular a semi-conductor component with a defined threshold voltage of a semi-conductor junction.

6. The circuit of claim 5, wherein the component is a diode that is connected between the resistor and the step up converter.

7. The circuit of claim 6, wherein the diode is connected between the resistor and the regulation input of the step up converter.

8. The circuit of claim 6, wherein the diode includes one or plural Schottky diodes or a double Schottky diode.

9. The circuit of claim 1, wherein the circuit and/or the step up converter include a device for detecting an undercut of a threshold value of the input voltage.

10. The circuit of claim 1, wherein the circuit is configured so that it includes a voltage divider and a transistor that are each connected between the first contacts and the step up converter, so that only a quiescent current of the step up converter flows in standby mode or hibernation.

11. The circuit of claim 1, wherein the circuit includes one or more flexible conductor paths for carriers.

12. A light- and/or signal element including at least one LED, an energy source, and the circuit of claim 1.

13. The light- and/or signal element of claim 12, wherein the at least one LED is a colored LED.

14. The light- and/or signal element of claim 12, wherein the light- and/or signal element includes a plurality of LEDs, in particular four LEDs, wherein all LEDs have identical characteristic forward voltages.

15. The light- and/or signal element of claim 12, wherein the light- and/or signal element includes a shell, wherein the shell includes the LEDs, and the circuit and the energy source are housed in an interior of the shell, further wherein the shell envelops in a moisture proof seal the LEDs, the circuit, and the energy source.

16. The light- and/or signal element of claim 15, wherein the shell is transparent.

17. The light- and/or signal element of claim 15, wherein the shell is elastic.

18. The light- and/or signal elements of claim 12, wherein the LEDs, the circuit, and the energy source are configured as ring-shaped, in particular as a band, in particular as a wristband, ankle band, or collar.

19. A method of using the light- and/or signal element of claim 12 for identifying a moving object or living being, in particular a human or animal, in particular a dog, in a substantially dark environment.

20. The circuit of claim 1, wherein the circuit unit for identifying an undercut of the threshold value of the input voltage is connected with the second contacts so that it generates a blinking of the LED when the threshold value is undercut by repeatedly loading the capacitor and generating a pulse when the battery has recovered and the voltage is above the threshold value, and afterwards switching off the LED when the voltage is below the threshold value.

* * * * *